(12) United States Patent
Peterson et al.

(10) Patent No.: US 7,143,909 B2
(45) Date of Patent: Dec. 5, 2006

(54) RECONFIGURABLE METERED MATERIAL DISPENSER

(75) Inventors: Scott Peterson, Cary, IL (US); Michael Tucker, Valatie, NY (US); Peter Elliot, Old Chatham, NY (US); James E. Johanson, Old Chatham, NY (US); Fedor Baranov, East Greenbush, NY (US); Innesa Baranov, East Greenbush, NY (US); Keith E. Antal, Sr., Valatie, NY (US)

(73) Assignee: Sonoco Development, Inc. SC (US)

( * ) Notice: Subject to any disclaimer, the term of this patent is extended or adjusted under 35 U.S.C. 154(b) by 94 days.

(21) Appl. No.: 10/851,871

(22) Filed: May 21, 2004

(65) Prior Publication Data

US 2005/0258189 A1    Nov. 24, 2005

(51) Int. Cl.
*B67D 5/00* (2006.01)
(52) U.S. Cl. .................. 222/83; 222/456; 222/565
(58) Field of Classification Search ............ 222/83, 222/142.2, 142.5, 142.9, 454, 456, 565
See application file for complete search history.

(56) References Cited

U.S. PATENT DOCUMENTS

| | | |
|---|---|---|
| 576,241 A | 2/1897 | Van Ame |
| 1,084,530 A | 1/1914 | Bettman |
| 1,618,688 A | 2/1927 | Tempest |
| 2,693,301 A * | 11/1954 | Allen, Jr. ............ 222/456 |
| 2,704,623 A | 3/1955 | Yasso |
| 3,172,580 A * | 3/1965 | Mackey ............ 222/456 |
| 3,760,983 A | 9/1973 | Thompson ............ 222/90 |
| 4,424,921 A | 1/1984 | Feuerstein et al. ...... 222/456 |
| 4,728,011 A | 3/1988 | Schuster et al. ........ 222/439 |
| 4,757,916 A * | 7/1988 | Goncalves ............ 222/83 |
| 4,790,453 A * | 12/1988 | Fontana et al. ........ 222/83 |
| 4,828,149 A | 5/1989 | Hester ............ 222/207 |
| 4,951,839 A | 8/1990 | Kong ............ 222/47 |
| 4,961,521 A | 10/1990 | Eckman ............ 222/142.5 |
| 5,169,049 A | 12/1992 | Krupic et al. ............ 227/456 |
| 5,346,105 A | 9/1994 | Onneweer ............ 222/455 |
| 5,454,487 A | 10/1995 | Vassiliou ............ 222/83.5 |
| 5,467,903 A | 11/1995 | Sorensen et al. ........ 222/455 |
| 5,601,213 A | 2/1997 | Daniello ............ 222/456 |

(Continued)

FOREIGN PATENT DOCUMENTS

DE    19917652    12/2000

(Continued)

*Primary Examiner*—Joseph A. Kaufman
(74) *Attorney, Agent, or Firm*—DLA Piper Rudnick Gray Cary US LLP

(57) ABSTRACT

A dispenser is provided for delivering a controlled quantity of a granular material. The dispenser includes a container assembly, a diffuser and a metering cup. The container includes a reservoir which supports a disposable cartridge of granular material. The cartridge is supported in the reservoir so as to define a passageway therebetween. A nozzle is defined for the outflow of material from the cartridge. The diffuser is disposed on one end of the container and includes a plurality of apertures. The metering cup is disposed on the opposite end of the container and has an open end adapted to receive granular material. Adjustment of the axial spacing between the nozzle and metering cup varies the quantity of granular material collected in the cup. The granular material is dispensed by inverting the container to a second orientation, such that material flows out of the metering cup, through the passageway and out of the diffuser. The nozzle may serve as a piercing mechanism for opening the disposable cartridge upon its insertion into the reservoir.

28 Claims, 6 Drawing Sheets

U.S. PATENT DOCUMENTS

| | | | |
|---|---|---|---|
| 5,683,361 A | 11/1997 | Elk et al. | 604/58 |
| 5,711,463 A | 1/1998 | Chen et al. | 222/456 |
| 5,894,965 A | 4/1999 | Robbins, III et al. | 222/444 |
| 6,269,983 B1 | 8/2001 | Jones et al. | 222/441 |
| 6,382,461 B1 | 5/2002 | Olsson | 222/1 |
| 6,422,426 B1 | 7/2002 | Robbins, III et al. | 222/158 |
| 6,494,350 B1 | 12/2002 | Kelley | 222/456 |
| 6,516,973 B1 | 2/2003 | Chrisman et al. | 222/153.14 |
| 6,948,641 B1 * | 9/2005 | Williams | 222/456 |
| 2001/0007327 A1 | 7/2001 | Ritsche et al. | 222/82 |
| 2002/0066747 A1 | 6/2002 | Argentieri et al. | 222/81 |

FOREIGN PATENT DOCUMENTS

| | | |
|---|---|---|
| EP | 0 335 505 | 10/1989 |
| GB | 21129285 | 11/1983 |
| WO | WO 02/026416 | 4/2002 |

* cited by examiner

RECONFIGURABLE METERED MATERIAL DISPENSER

FIELD OF THE INVENTION

The present invention relates to dispensers for delivering a predetermined amount of granular/particulate material, and more particularly, to new and useful dispenser capable of varying the quantity of material such that the same dispenser may be used for various materials e.g., seasonings, colorants, concentrates, powdered mixtures etc.

BACKGROUND OF THE INVENTION

Dispensers are commonly employed to add seasonings and flavorings to foods and/or beverages. Typically, seasonings such as table salt and ground pepper are dispensed from shakers comprising a single-chamber container or reservoir. The container typically includes an end cap comprising a plurality of apertures to allow the material to be dispensed upon inverting and agitating the shaker. The size and number of apertures generally will vary with the type of material to be dispensed. For example, a dispenser for table salt will typically have fewer apertures than, for example, a pepper dispenser inasmuch as the density and concentration of table salt is such that smaller quantities are desired (i.e., with each oscillation of the container.) Generally, a dedicated dispenser with the appropriately sized/numbered apertures will be employed for each material to control the rate of dispensation. While the size and number of apertures can control the flow rate of material, the user must monitor other variables such as the length of time, number of oscillations, etc., to accurately control the quantity of dispensed material.

Many prior art dispensers address the need to deliver a controlled or preset amount of material by employing two or more chambers and a delivery tube. A first chamber forms a material reservoir while a second chamber is calibrated for measuring the material. The chambers are typically stacked, one above the other or in tandem. The delivery tube communicates with the measuring chamber at one end, extends through the reservoir, and at the opposite end, communicates with the apertures of the dispenser. Bettman U.S. Pat. No. 1,084,530; Buckland U.S. Pat. No. 1,270,262; Abbott U.S. Pat. No. 1,707,967; Cagliostro U.S. Pat. No. 1,877,808; Trautvetter U.S. Pat. No. 1,763,449; Gordon U.S. Pat. No. 2,644,616; and Feuerstein et al. U.S. Pat. No. 4,434,921 are exemplary of this type of dispenser. While these dispensers deliver a predetermined amount of material, they are not reconfigurable or adjustable for dispensing variable quantities of material.

Yet another metered material dispenser is disclosed in Jones et al. U.S. Pat. No. 6,269,983. Therein, a measuring cup is disposed in combination with an end of the dispenser for receiving material when the dispenser is face-up, i.e., with the dispensing end facing upwardly. Furthermore, when the dispenser is inverted, material flows into a passageway defined by and between co-axial, cylindrical containers. Once in the passageway, the material flows downwardly and out of a dispensing end cap or diffuser. The configuration and spacing of the containers does not permit excess material to be dispensed, even when vigorously agitated.

Eckman U.S. Pat. No. 4,961,521 discloses an adjustable metered dispenser useful for delivering seasonings such as salt and pepper. Eckman's dispenser comprises two chambers arranged in seriatim. The first chamber is a material reservoir and the second chamber is a measuring chamber. Eckman's dispenser exhibits an ability to close the metering chamber from the reservoir chamber when the material is dispensed. Thus, in order avoid over-dispensing, the user must be sure that the passageway between the two chambers is closed.

Krupic U.S. Pat. No. 5,169,049 also discloses a shaker for dispensing seasonings such as salt and pepper. The shaker comprises three chambers: a material reservoir chamber, a measuring chamber and a dispensing chamber. The reservoir chamber is disposed between the measuring chamber and the dispensing chamber while a delivery tube communicates with the measuring chamber and the dispensing chamber. When the dispenser not in use, the measuring chamber faces downwardly. During use, the dispenser is inverted, and the dispensing chamber is filled with the material from the measuring chamber. The material must then be dispensed by shaking the dispenser in the inverted position to evacuate the material from the dispensing chamber via a plurality of apertures. In order to prevent over dispensing, one embodiment of the device includes shake-back guards within the reservoir chamber.

While dispensers such as those disclosed in the Eckman '521 and Krupic '049 patents provide adjustable metering of material, they are complex, costly to manufacture, and prone to failure. With respect to the latter, it will be appreciated that any material dispenser which employs valving or other moving elements can lead to accretion of material and malfunction of the dispenser. On the other hand, dispensers such as that disclosed in the Jones et al. '983 patent, while simple and inexpensive, lack the ability to deliver variable quantities of material.

A need therefore exists for a dispenser which is non-complex, inexpensive to fabricate, reusable, and versatile, i.e., capable of dispensing variable quantities of a material or dispensing a variety of different materials.

BRIEF SUMMARY OF THE INVENTION

A dispenser is provided for delivering variable quantities of material or dispensing a variety of different materials. The dispenser comprises a container assembly, a diffuser, a metering cup and an adjustment device for varying the quantity of dispensed material. The container assembly includes a reservoir disposed internally of an external container and defines a passageway therebetween. The reservoir is adapted for containing the granular material and defines a nozzle for the outflow of material. The diffuser is disposed in combination with an end of the container assembly and includes a plurality of apertures which are in fluid communication with the passageway. A metering cup is disposed in combination with the other end of the container assembly and has an open end adapted for receiving material from the nozzle. Furthermore, the metering cup and the nozzle define a control volume for the accumulation of material which is variable by an adjustment device. In the preferred embodiment, the adjustment device varies the axial spacing between the nozzle and metering cup. Granular material is collected in the metering cup when the dispenser is disposed in a first orientation and dispensed by inverting the container assembly, i.e., in a second orientation, such that material flows out of the metering cup, into the passageway and out via the diffuser.

For a better understanding of the invention, its advantages and the specific objects obtained by its uses, reference should be made to the accompanying drawings and detailed description which illustrate preferred embodiments of the invention.

BRIEF DESCRIPTION OF THE DRAWINGS

For the purpose of illustrating the invention, the drawings show forms of the invention which are presently preferred. However, it should be understood that this invention is not limited to the precise arrangements and instrumentalities shown in the drawings.

DETAILED DESCRIPTION OF THE DRAWINGS

Figure 1:
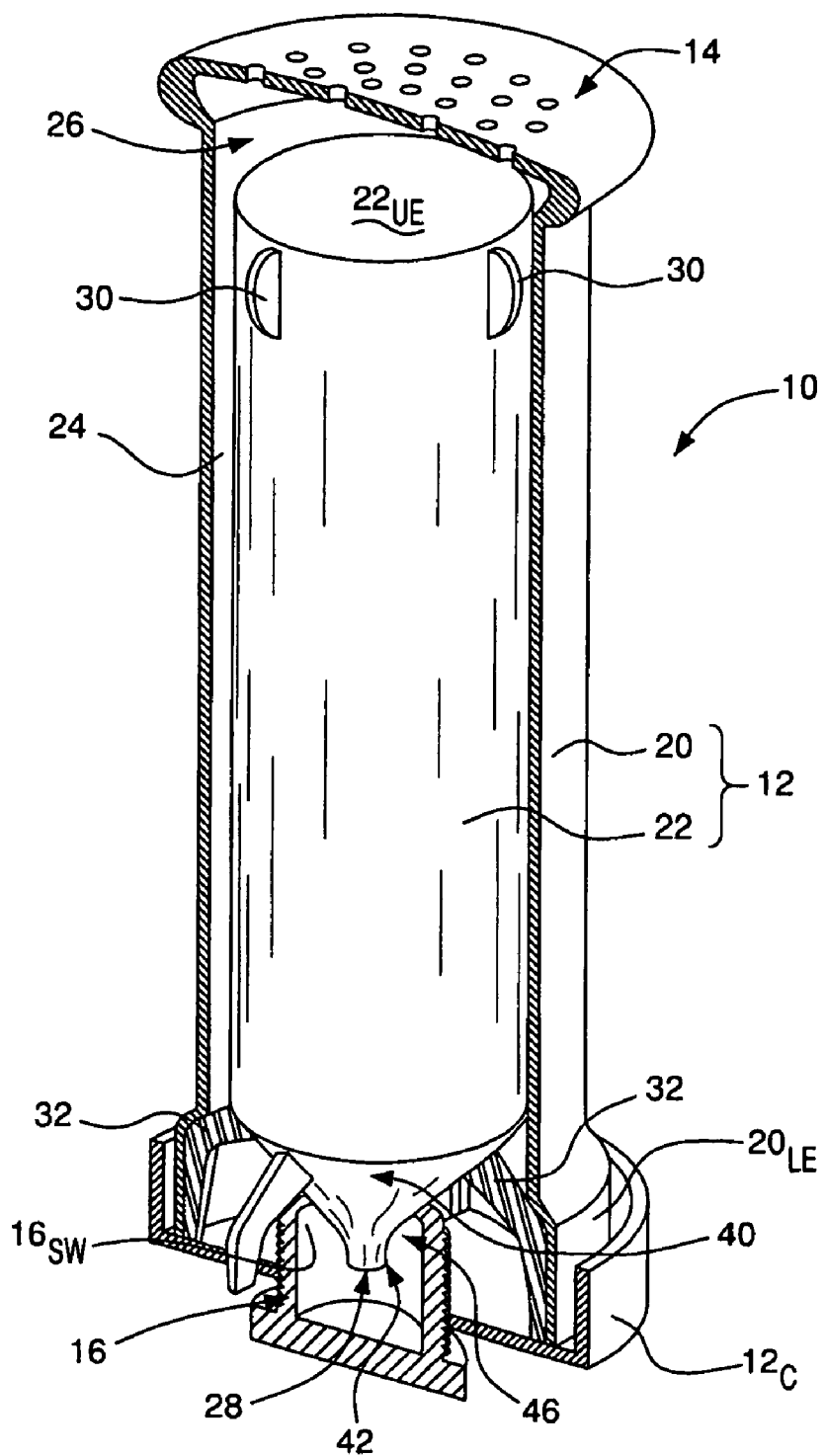
FIG. 1 is a perspective view of a reconfigurable dispenser according to the present invention which is partially broken away to reveal internal details and components.

Referring now to the drawings wherein like numerals indicate like elements, FIG. 1 depicts an exemplary embodiment of a dispenser 10 according to the present invention. The dispenser 10 is primarily used to dispense medium to course particulate material such as salt, but may also be used to dispense fine or ultra-fine granular material, such as confection sugar, cinnamon or other such seasonings. Furthermore, while the teachings herein are described in the context of the food service/preparation industry, it will be appreciated that the teachings herein are applicable to measuring and dispensing any granular or particulate material. Examples include the measurement and delivery of particulate materials in the building industry, e.g., cements, stone dust, sand, or in the manufacturing industry e.g., concentrates in plastics, colorants in wax, etc. As will become readily apparent from the following detailed description, the dispenser 10 is multi-purpose and may be reconfigured to dispense variable quantities of material or dispensing a variety of different materials.

The dispenser 10 comprises a central container assembly 12 loaded or filled with a granular material (not shown in FIG. 1), a diffuser 14 disposed at one end of the container assembly 12 for dispensing the granular material in any of a variety of distribution/dispensing patterns, a metering cup 16 disposed at the other end of the container assembly 12 for preparing a predetermined quantity of material for dispensation, and a means for varying the volume of material. More specifically, the central container assembly 12 comprises an external container 20 and an internal reservoir or cartridge 22, the outer container 20 circumscribing the internal reservoir 22 to produce a passageway 24 therebetween. Furthermore, the container and reservoir 20, 22 define a collection chamber 26 between the diffuser 14 and an end $22_{UE}$ of the internal reservoir 22. The collection chamber 26 and passageway 24 are in communication thereby permitting flow of material therebetween. The function of the passageway 24 and collection chamber 26 will become clear when discussing the operation of the dispenser 10. The internal reservoir 22 is filled with the granular material and includes an orifice 28 at one end which opposes the metering cup 16.

The container 20 and internal reservoir 22 may be fixedly attached to each other. In the preferred embodiment, the internal reservoir 22 is a disposable cartridge, i.e., replaceable when empty. As such, one end of the container assembly e.g., is detachable to enable loading and unloading of the disposable cartridge. In the described embodiment, a detachable end cap $12_C$ is disposed in combination with the outer container 20 to close an end $20_{LE}$ which is open for accepting or removing the internal reservoir 22, i.e., when reloading the dispenser 10. In the preferred embodiment, tabs 30 and/or fins 32 may be disposed in combination with either the outer container 20 or internal reservoir 22 to center and axially position the container 20 and reservoir 22. That is, the tabs 30 are disposed radially therebetween to center and maintain the relative spacing of the container 20 and reservoir 22. As such, the tabs 30 ensure that a constant flow area is maintained with respect to the passageway 24. Furthermore, while the fins 32 may similarly function to center the container 20 and reservoir 22, more importantly, they serve to fix the relative axial position therebetween. As such, the fins 32 maintain a constant volume within the collection chamber 26 and fixed spacing between the orifice 28 and metering cup 16. The significance of the relative axial position of the container 20 and reservoir 22 will become clear in subsequent paragraphs when discussing the operation of the dispenser 10.

The internal reservoir 22 preferably forms a nozzle 40 at one end having a nose portion 42 which is disposed within the metering cup 16, i.e., inserted relative to but not touching a sidewall portion $16_{SW}$ of the cup 16. Consequently, an annular opening 46 is formed between the nose 42 and the container sidewall $16_{SW}$. Further, the annular opening 46 is in fluid communication with the passageway 24. Hence, it will be appreciated that a flow path exists into and out of the metering cup 16, i.e., entering via the nozzle 40 and exiting through the annular opening 46. Furthermore, the flow path continues from the annular opening 46 to the passageway 24, into the collection chamber 26, and out through the diffuser 14. A dispenser, having a flow path similar to that described therein is discussed in commonly-owned Jones et al. U.S. Pat. No. 6,269,983 and, for the purposes of appending additional detail and applicable alternate embodiments, is incorporated herein by reference in its entirety.

Before discussing the operation of the dispenser, it will be useful to describe some of the general teachings and principles which enable accurate metered dispensation of granular material. These same teachings enable variable dispensation of the same or different granular materials. The teachings involve an understanding of the material properties along with various geometric relationships between the dispenser elements. More specifically, it should be recognized that granular materials, having a relatively constant particulate size and geometry, have a characteristic flow and accumulation pattern. Materials, therefore, may be examined and characterized to accurately predict their accumulation patterns. Moreover, metered quantities may be delivered/dispensed simply by controlling the geometric/spatial relationships between dispenser elements.

Figure 2A:
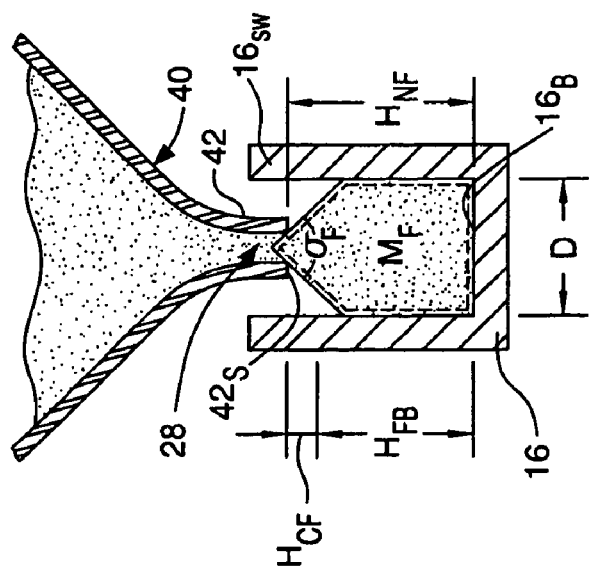
FIGS. 2a and 2b are schematic views of a nozzle and metering cup employed in the inventive dispenser.
Figure 2B:
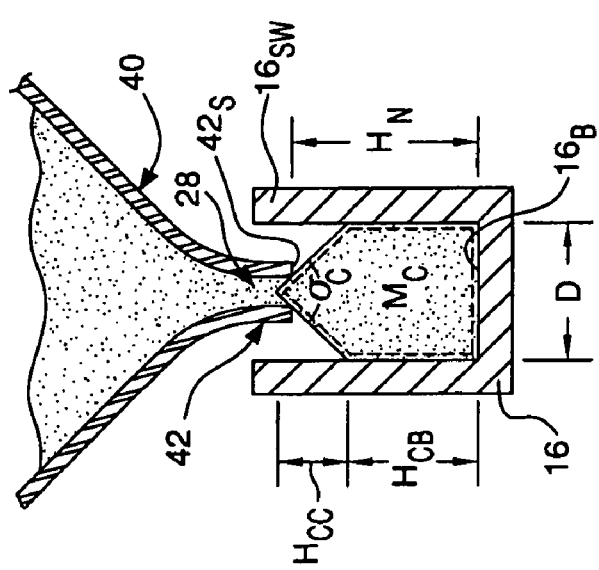

For example, and referring to FIGS. 2a and 2b, a nozzle 40 is inserted within a metering cup 16 having a base dimension D. The nose portion 42 has a face surface $42_S$ which is disposed a height $H_N$ relative to the base $16_B$ of the cup 16. More specifically, and referring to FIG. 2a, a first granular material $M_F$ (for example, a material having a fine particulate size) accumulates within the cup 16 until the material $M_F$ occludes the orifice 28 of the nozzle 40. The first granular material $M_F$ accumulates to form a conical shape having a vertex or incidence angle $\theta_F$. In FIG. 2b, a second material $M_C$, for example, a material having a course or large particulate size, accumulates within the metering cup 16 and forms a conical shape defining an incidence angle $\theta_C$.

By examination of each, it will be appreciated that the incidence angles $\theta_F$, $\theta_C$ of each differ, i.e., the incidence angle $\theta_f$ associated with the first granular material $M_F$ is greater than the incidence angle $\theta_C$ associated with the second granular material $M_C$. Furthermore, the incidence angles $\theta_F$, $\theta_C$ vary the height dimensions $H_{CF}$ $H_{CC}$ of each cone section and, consequently, the volume or quantity of material collected. The volume or quantity of each material may be determined using the following relationships:

$$\text{Vol } M_F = (1/3)(D/2)^2(\Pi)(H_{CF}) + (D/2)^2(\Pi)(H_{FB}) \quad (1.0)$$

$$H_{CF} = H_{NF} - H_{FB} \quad (1.1)$$

$$\text{Vol } M_C = (1/3)(D/2)^2(\Pi)(H_{CC}) + (D/2)^2(\Pi)(H_{CB}) \quad (2.0)$$

$$H_{CC} = H_N - H_{CB} \quad (2.1)$$

wherein $H_{FB}$ and $H_{CB}$ are the height dimensions to the base of each respective cone section, i.e., the point of material accumulation along the sidewall $16_{SW}$ of each metering cup. Furthermore, relationships 1.0 and 2.0 above assume that the sidewalls $16_{SW}$ of the metering cup form a cylindrical section.

Figure 3:
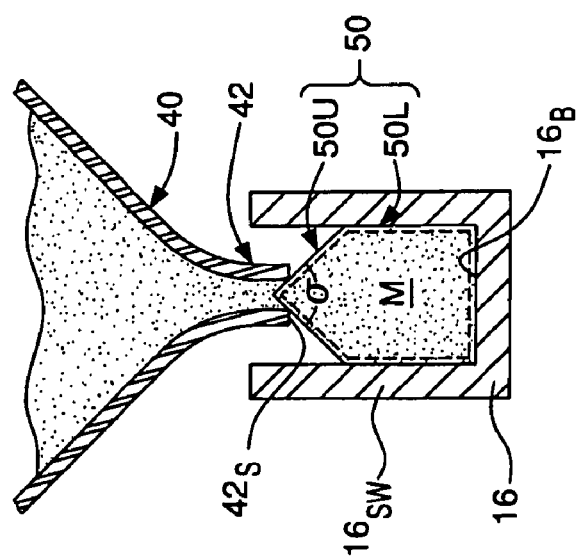
FIG. 3 is a schematic view similar to those in FIGS. 2a and 2b depicting a control volume defined by the geometry of the metering cup and the axial spacing between the nozzle and base of the metering cup.

In addition to the container geometry, e.g., its diameter, the incidence angle of the granular material will need to be defined to accurately set the quantity of dispensed material. Referring to FIG. 3, the nozzle 40 and metering cup 16, therefore, define a control volume 50 (shown in dashed lines) for the accumulation of material M. In the broadest sense of the invention, the control volume 50 is defined by the geometry of the metering cup 16 in combination with the accumulation characteristics of the material M defined by the incidence angle $\theta$. More specifically, a lower portion $50_L$ of the control volume is bounded by the base and sidewalls $16_B$, $16_{SW}$ of the metering cup 16 and an upper portion $50_U$ is a function of the incidence angle $\theta$ produced by the granular material M.

In the described embodiment, the lower portion $50_L$ of the control volume 50 is cylindrically shaped and the upper portion is conically shaped. However, the control volume 50 may comprise other three-dimensional shapes depending upon the cross-sectional shape of the metering cup 16 and the configuration of the nozzle 40. For example, a metering cup 16 having a square cross-sectional shape will produce a cubical lower portion while a nozzle 40 having a linear orifice may produce a prismatic upper portion, i.e., a parallelopipedon.

Figure 4B:
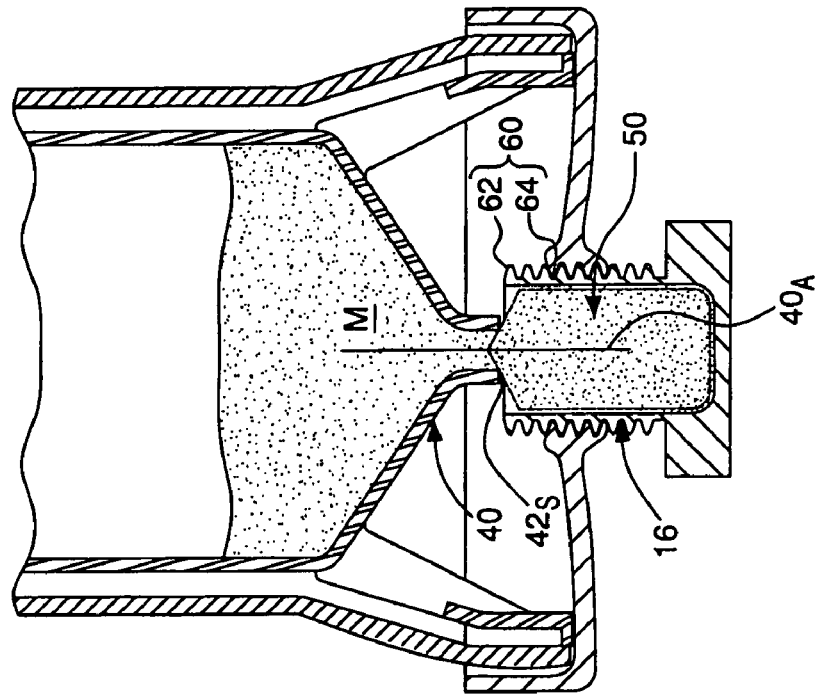
FIGS. 4a and 4b show an adjustment device for controlling and varying the axial spacing, the control volume and the quantity of material to be dispensed.
Figure 4A:
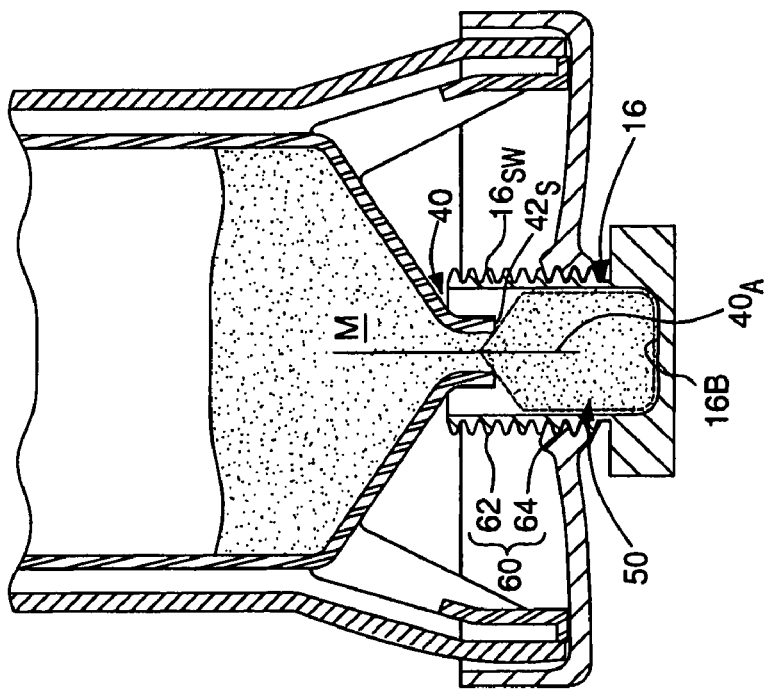

Furthermore, in view of the relationships discussed above, it will be appreciated that a difference in material quantity occurs despite the constant container geometry and constant spatial relationship between the face $42_S$ of the nozzle 40 (see FIGS. 2a and 2b) and the metering cup 16. Accordingly, the inventors recognized that by varying the axial spacing or distance $H_N$ from the base $16_B$ of the cup 16 to the face $42_S$ of the nozzle 40, the quantity of material accumulation may be varied. In FIGS. 4a and 4b, an adjustment device 60 is provided for varying the relative axial position of the nozzle 40 and the base $16_B$ of the metering 16. FIGS. 4a and 4b show the metering cup 16 at different axial positions thereby increasing or decreasing the control volume 50.

In the preferred embodiment, the metering cup 16 includes threads 62 disposed along the exterior of the container sidewall $16_{SW}$ and the container assembly 12 forms a threaded aperture 64 for engaging the container threads 62. The threads 62, 64 are substantially orthogonal to the material fill direction, e.g., the longitudinal axis $40_A$ of the nozzle 40 such that the metering cup 16 may translate axially toward or away from the nozzle 40. Accordingly, the axial spacing from the face $42_S$ of the nozzle 40 to the base $16_B$ of the metering cup 16 may be changed to vary the control volume 50. Preferably, the threads 62 are relatively course such that a full (i.e., 360 degree) rotation of the metering cup 16 effects a meaningful change in the control volume 50.

Figure 5A:
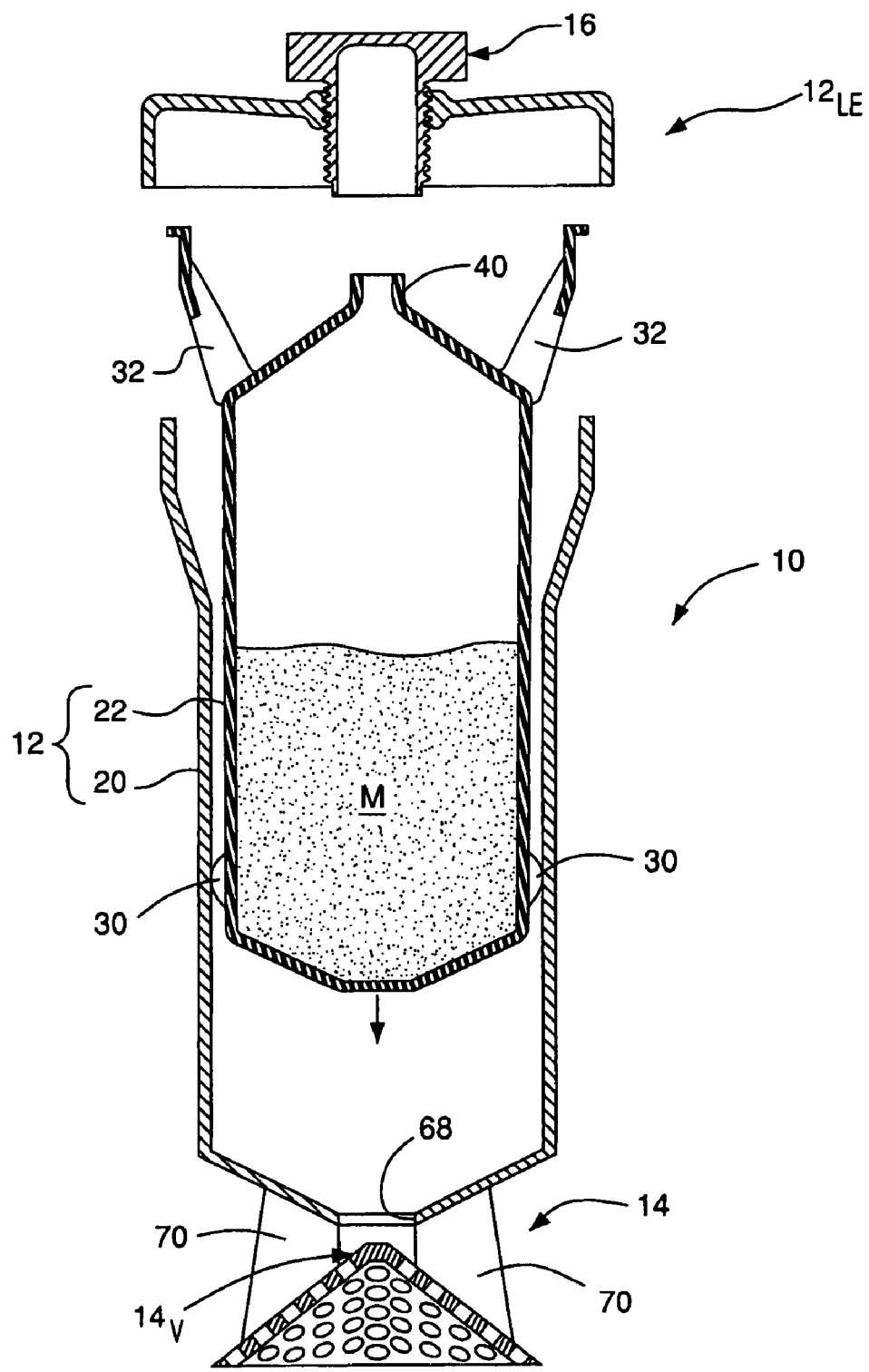
FIGS. 5a–5d show the dispenser in various operating orientations: assembled and stored (FIG. 5a), loaded/prepared for material dispensation (FIG. 5b), inverted for delivering an accurate or metered quantity of granular material (FIG. 5c), and inverted again to reload a quantity of material (FIG. 5d).
Figure 5D:
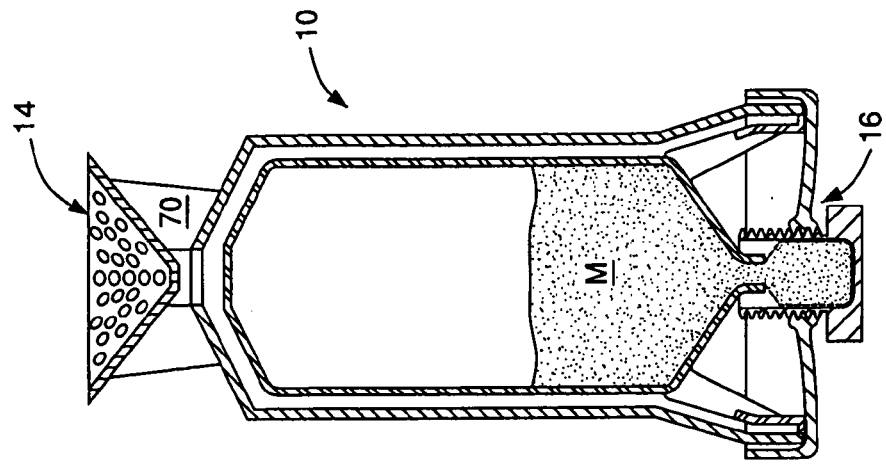
Figure 5C:
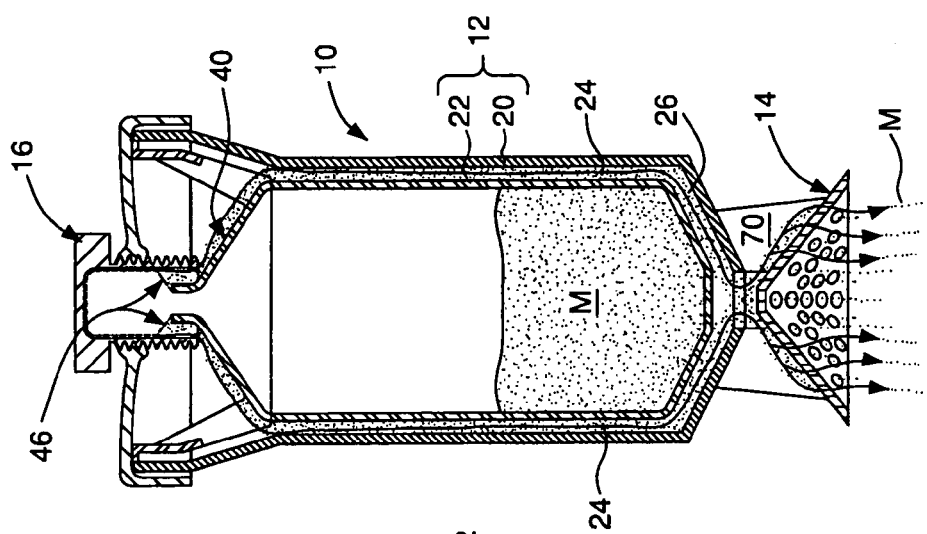
Figure 5B:
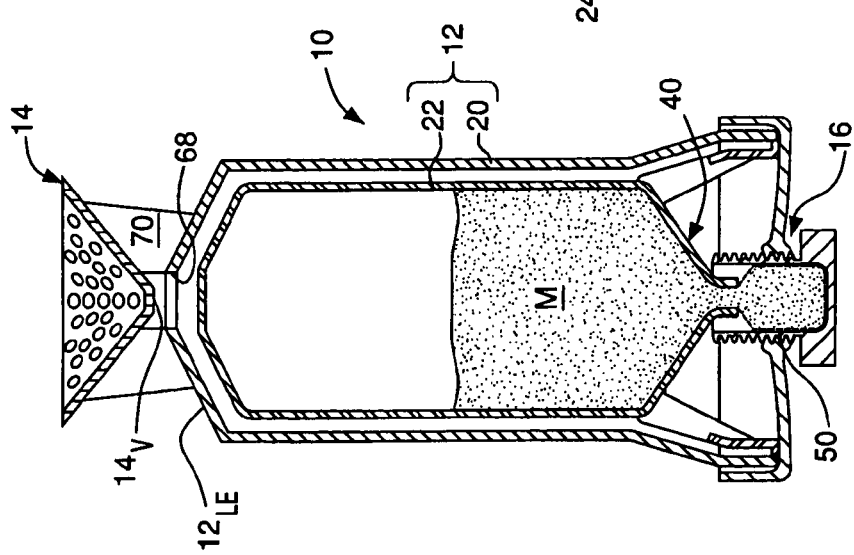

In FIGS. 5a–5d, the preparation and operation of the dispenser 10 includes detaching an end of the container assembly 12, e.g., removing the end $12_{LE}$ containing the metering cup 16, for inserting the internal reservoir 22 into the outer container 20 (see FIG. 5a). Generally, to avoid spillage of the granular material M, the internal reservoir 22 is oriented such that the nozzle 40 faces upwardly as the internal reservoir is lowered into the outer container 20. Furthermore, the tabs 30 and fins 32 function to maintain the radial and axial spacing between the container 20 and reservoir 22. In FIG. 5b, the dispenser 10 is ready for use with the diffuser 14 facing upwardly, and the metering cup 16 disposed downwardly. In this embodiment, the diffuser 14 is conically shaped with the vertex $14_V$ v of the cone facing toward a central aperture 68 disposed through an end $12_{LE}$ of the container assembly 12 and into the delivery chamber 26. Such a diffuser 14 is described in greater detail in the aforementioned U.S. Pat. No. 6,269,983 B1 to Jones et al.

In FIG. 5b, gravity fills the metering cup 16 until the material M has accumulated to the height of the nozzle 40. Moreover, the material M accumulates, filling the control volume 50 between the nozzle 40 and cup 16, in a conical pattern as described above. Knowing the characteristics of the material M, i.e., the incidence angle, a predetermined quantity is loaded into the metering cup 16.

In FIG. 5c, the container assembly 12 is inverted again, i.e., rotated 180 degrees, such that gravity causes the material M to flow out of the annular opening 46 and into the passageway 24. The conical end shape of the internal reservoir 22 facilitates equal flow of material M to the passageway 24. As gravity causes the material M to flow through the passageway 24 into the collection chamber 26, the container assembly 12 is agitated to cause the material M to be dispensed/distributed evenly out of the apertures of the diffuser 14. In the described embodiment, vertical baffles 70 divide the flow of material M evenly into each of four quadrants. In FIG. 5d, the dispenser 10 is once again inverted, i.e., the diffuser 14 facing upwardly, to reload the metering cup 16 and prepare the dispenser 10 for subsequent use. Either end of the dispenser 10 may be configured to have a planar surface to enable storage in either position, i.e., the metering cup 16 disposed upwardly or downwardly.

Returning to our discussion of the adjustment device 60, variation of the control volume 50 may be effected in a variety of ways. For example, the internal reservoir 22 may be axially displaced relative to the outer container 20 to effect the requisite variation between the nozzle 40 and metering cup 16. Alternatively, the entire end portion of the container assembly 12$_{LE}$, i.e., the end portion incorporating the metering cup 16 may be interchangeable to effect substitution of other metering cups 16 to vary the axial spacing, i.e., closer or farther away from the nozzle 40. Furthermore, the nozzle 40 or nose portion thereof may be extensible. Discs or cups may be inserted into the metering cup 16 to alter its internal dimensions. Many other techniques are readily envisioned once the underlying teaching of the invention is understood.

Figure 6A:
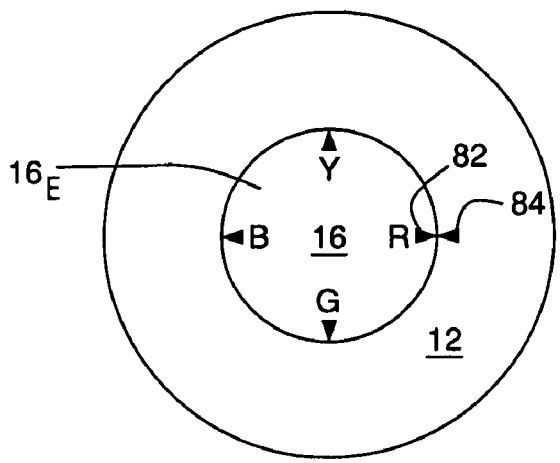
FIGS. 6a and 6b show an alternate embodiment of the invention wherein indicia are employed to provide an indication of material quantity.
Figure 6B:
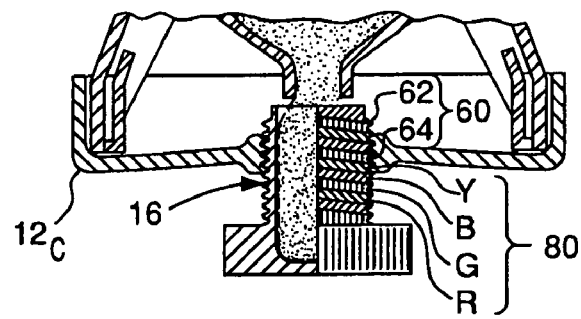

In FIGS. 6a and 6b, another embodiment of the invention is depicted wherein indicia 80 (FIG. 6a) are displayed on the exterior 16$_E$ of the metering cup 16 to indicate axial positions corresponding to metered material quantities. For example, the threads 62 may be individually color coded, R-Red, G-Green, B-Blue, Y-Yellow, indicative of various quantities of material (i.e., changing the size of the control volume). Red may be indicative of one teaspoon, Green indicative of two teaspoons, and so on. In FIG. 6b, it may also be desirable to provide a secondary cue, i.e., indicia 82 indicative of an angular position. That is, depending upon the degree of accuracy desired, it will be appreciated that the thread may be visible, yet the rotational position may vary by as much as ninety degrees without being noticed by the user. Hence, by aligning indicia 82 (e.g., in connection with the Blue thread B) with the reference arrow 84, the correct rotational position may also be established to achieve a greater degree of accuracy. Should a dispenser 10 be intended for various different materials, multiple indicia may be employed on the same display.

Figure 7:
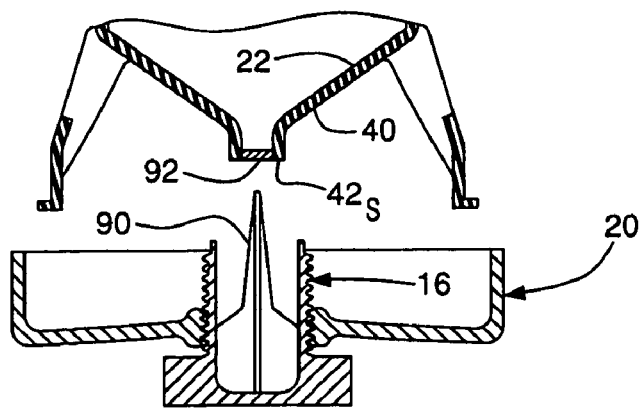
FIG. 7 shows yet another embodiment of the dispenser including means for piercing an internal cartridge as the dispenser is assembled.

In FIG. 7, another embodiment of the invention is depicted wherein the dispenser 10 further comprises a means 90 for effecting an opening in the internal reservoir or cartridge 22. In this embodiment, the cartridge 22 remains closed until the dispenser 10 is fully assembled. More specifically, the cartridge 22 is provided fully-loaded with material M and sealed along the face 42$_S$ of the nozzle 40 by a plastic or foil membrane 92. The opening means 90 is interposed between the metering cup 16 and the nozzle 40 such that upon insertion of the internal reservoir 22, the sealed plastic or foil membrane 92 is punctured to permit the flow of material M.

In the preferred embodiment, the opening means 90 includes a cruciform-shaped arrow head disposed along the longitudinal axis 40A of the nozzle 40 and facing the membrane 92. As the internal reservoir 22 is axially positioned, the arrow head pierces the membrane 92 to effect an opening in the nozzle 40. The arrow head is appropriately configured to cause the foil membrane 92 to peal back along the internal surface of the nozzle to provide an unobstructed opening for the flow of material M.

In summary, the dispenser 10 is capable of accurately delivering various quantities of material while, furthermore, being sufficiently versatile to dispense different materials. The dispenser 10 employs a simple, inexpensive mechanism for quickly and accurately changing the material quantity to be dispensed. The dispenser 10 may be reconfigured to rapidly change materials by the use of a disposable cartridge 22 and adjustable/detachable metering cup 16. A simple adjustable metering cup 16 will generally be employed for materials having similar accumulation characteristics or similar dispensation quantity requirements. A detachable/replaceable metering cup 16 will typically be employed for materials which exhibit greater differences in quantity requirements. For example, grated cheese will require a much larger control volume and, consequently, metering cup 16, then iodized salt.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A dispenser for delivering granular material, comprising:
   a container assembly having a first reservoir area and an internal reservoir, the reservoirs positioned relative to one another so as to define a passageway therebetween,
   said internal reservoir disposed internally of said first reservoir and adapted for containing granular material, said internal reservoir further defining a nozzle for the outflow of material,
   a diffuser disposed in combination with an end of said container assembly and having a plurality of apertures in communication with said passageway;
   a metering cup disposed in combination with the other end of said container assembly and having an open end adapted for receiving material from said nozzle, said metering cup and said nozzle defining a control volume for accumulating material when said container assembly is disposed in a first orientation and delivering material to said diffuser via said passageway when disposed in a second orientation; and
   an adjustment device for varying said control volume such that said metering cup may deliver variable quantities of granular material.

2. The dispenser according to claim 1 wherein said metering cup includes a base and a sidewall structure, wherein said nozzle defines a face surface axially spaced from said base structure, and wherein said adjustment device varies said axial spacing to vary said control volume.

3. The dispenser according to claim 2 wherein said adjustment device includes threads disposed on said sidewall structure of said metering cup and a threaded aperture disposed though an end portion of said container assembly, said metering cup and said container assembly threadably engaging to vary said axial spacing.

4. The dispenser according to claim 3 further comprising indicia displayed on the exterior of said metering cup and on the exterior of said container assembly, said indicia indicative of the axial spacing for displaying the quantity of material to be dispensed.

5. The dispenser according to claim 2 further comprising a display device indicative of said axial spacing for indicating the quantity of material to be dispensed.

6. The dispenser according to claim 1 wherein said metering cup is detachably connected to said container assembly, and wherein adjustment device includes at least two interchangeable metering cups having different geometric dimensions for varying said control volume.

7. The dispenser according to claim 6 wherein said piercing device is a arrow head structure disposed in combination with said outer container and oriented inwardly toward said internal reservoir.

8. The dispenser according to claim 1 wherein said metering cup defines an internal geometry and wherein said granular material accumulates to define an incidence angle, said control volume being defined by said metering cup geometry and said incidence angle.

9. The dispenser according to claim 1 further comprising a device for piercing said internal reservoir to produce an opening in said nozzle upon assembly of said container assembly.

10. The dispenser according to claim 9 wherein said piercing device is an arrow head structure disposed in combination with said metering cup and oriented inwardly toward said internal reservoir.

11. A dispenser for delivering various granular materials, comprising:
- a container assembly having an outer container and a replaceable inner container for containing a granular material, said container and reservoir defining a passageway therebetween,
- said inner container, furthermore, defining a nozzle for the outflow of material,
- a diffuser disposed in combination with an end of said outer container and having a plurality of apertures in communication with said passageway;
- a metering cup disposed in combination with the other end of said outer container and having an open end opposing said nozzle, said metering cup and said nozzle defining a control volume for the accumulation of material when said container assembly is disposed in a first orientation and delivering said material to said diffuser via said passageway when disposed in a second orientation; and
- a means for adjusting said control volume such that said metering cup may deliver variable quantities of the same or different granular materials.

12. The dispenser according to claim 11 wherein said metering cup includes a base and a sidewall structure, wherein said nozzle defines a face surface axially spaced from said base structure, and wherein said adjustment means effects a variation of said axial spacing to vary said control volume.

13. The dispenser according to claim 12 wherein said adjustment means includes threads disposed on said sidewall structure of said metering cup and a threaded aperture disposed though an end portion of said container assembly, said metering cup and said container assembly threadably engaging to vary said axial distance.

14. The dispenser according to claim 13 further comprising indicia displayed on the exterior of said metering cup and on the exterior of said container assembly, said indicia indicative of the axial spacing for displaying the quantity of material to be dispensed.

15. The dispenser according to claim 12 further comprising a display device indicative of said axial spacing for indicating the quantity of material to be dispensed.

16. The dispenser according to claim 11 wherein said metering cup is detachably connected to said container assembly, and wherein adjustment means includes at least two interchangeable metering cups having different geometric dimensions for varying said control volume.

17. The dispenser according to claim 16 wherein said piercing device is a arrow head structure disposed in combination with said outer container and oriented inwardly toward said internal reservoir.

18. The dispenser according to claim 11 wherein said metering cup defines an internal geometry and wherein said granular material accumulates to define an incidence angle, said control volume being defined by said metering cup geometry and said incidence angle.

19. The dispenser according to claim 11 further comprising a device for piercing said internal reservoir and producing an opening in said nozzle upon assembly of said container assembly.

20. The dispenser according to claim 19 wherein said piercing device is an arrow head structure disposed in combination with said metering cup and oriented inwardly toward said internal reservoir.

21. The dispenser according to claim 19 further comprising radial fins for maintaining the axial spacing between said outer container and internal reservoir.

22. The dispenser according to claim 19 further comprising radial tabs for maintaining the radial spacing between said outer container and internal reservoir.

23. The dispenser according to claim 19 further comprising radial fins and radial tabs for maintaining the axial and radial spacing, respectively, between said outer container and internal reservoir.

24. A dispenser for delivering granular material comprising:
- an outer container defining an internal reservoir,
- a diffuser disposed at one end of the container for dispensing granular material from the container;
- means for supporting a disposable cartridge retaining granular material within the reservoir of the container, such that a passageway is defined between the internal walls of the container and the disposable cartridge,
- a metering cup disposed at one end of the container, opposite the diffuser, the metering cup defining a controlled volume for granular material transferred from a disposable cartridge and, upon inversion of the container, for delivering the controlled volume through the passageway to the diffuser for dispensing, and
- a piercing mechanism for engaging a disposable cartridge inserted into the reservoir of the container and for delivering granular material from the cartridge to the metering cup.

25. The dispenser according to claim 24 wherein the metering cup further comprises means for adjusting the controlled volume of granular material received from a disposable cartridge and then delivered to the diffuser upon inversion of the container.

26. The dispenser according to claim 24 wherein the piercing mechanism comprises a nozzle supported adjacent to the metering cup and a projected end that engages a disposable cartridge upon its insertion into the reservoir and being engaged by the supporting means.

27. The dispenser according to claim 24 wherein the piercing mechanism is integral with the metering cup.

28. The dispenser according to claim 24 further comprising a threaded support fixed to the container, the metering cup being threaded onto the support to adjust the position of the metering cup with respect to the piercing mechanism, the position of the metering cup relative to the piercing mechanism serving to adjust the controlled volume.

* * * * *